C. B. PATCH.
FRICTION GEAR.
APPLICATION FILED JULY 15, 1916.
1,256,826.
Patented Feb. 19, 1918.
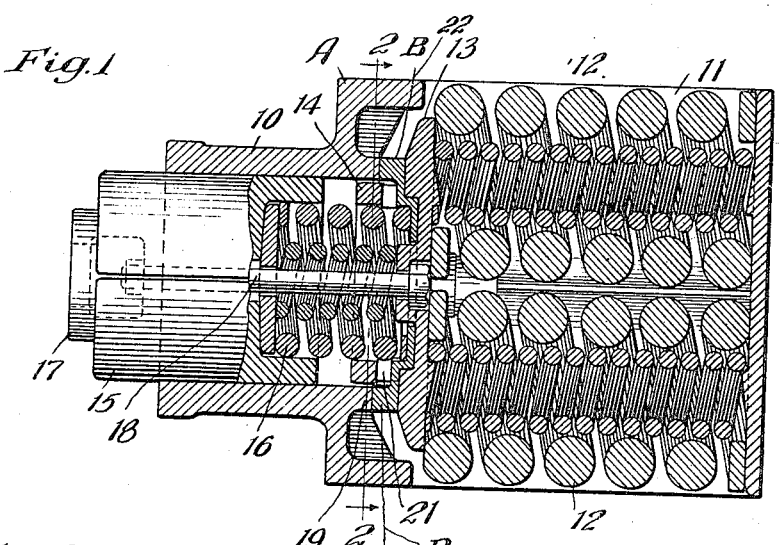
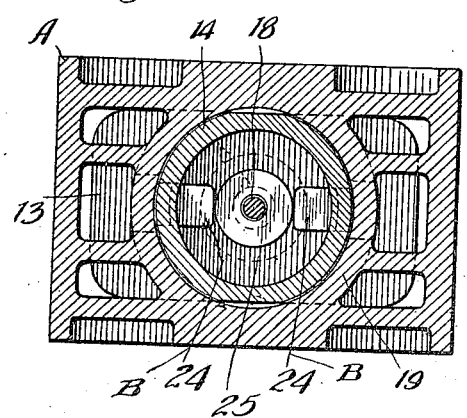
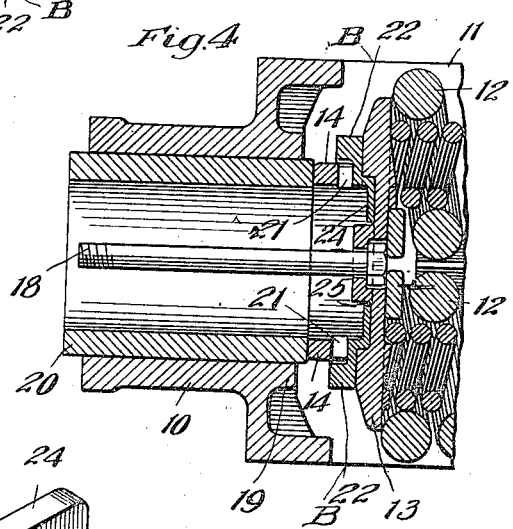
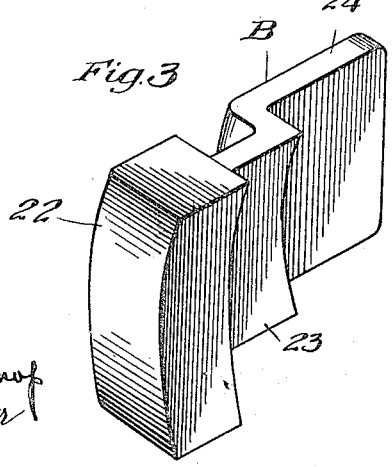
WITNESSES:
INVENTOR.
Calvin B. Patch
BY
ATTORNEY

UNITED STATES PATENT OFFICE.

CALVIN B. PATCH, OF GLENELLYN, ILLINOIS, ASSIGNOR TO WILLIAM H. MINER, OF CHAZY, NEW YORK.

FRICTION-GEAR.

1,256,826.  Specification of Letters Patent.  Patented Feb. 19, 1918.

Application filed July 15, 1916. Serial No. 109,445.

*To all whom it may concern:*

Be it known that I, CALVIN B. PATCH, a citizen of the United States, residing at Glenellyn, in the county of Dupage and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

As is well known, it is desirable in friction gears for railway cars, to have the main springs under an initial compression to compensate for wear and to prevent looseness of the parts. Heretofore, in the assembling of certain types of friction gears, in order to obtain the preliminary spring compression above referred to, considerable difficulty has been experienced in inserting the springs under initial compression.

The object of this invention is to provide a simple expedient for overcoming the difficulties above indicated and more particularly to facilitate the assembling of the parts of that type of friction gear commonly known as the Miner A[18] type and related types wherein twin arranged springs are placed behind a follower that is located at the rear of the friction elements proper.

In the drawing forming a part of this specification, Figure 1 is a longitudinal sectional view of a friction gear showing my improvements in connection therewith. Fig. 2 is a transverse, sectional view of the gear proper and taken on the line 2—2 of Fig. 1. Fig. 3 is a detail perspective of the improved key employed in my invention. And Fig. 4 is a broken view similar to Fig. 1, illustrating the manner of assembling the parts, in actual practice.

Referring to said drawing, A denotes a casting which has formed integrally therewith a friction cylinder 10 and a twin spring cage or casing 11. The latter is substantially rectangular in cross section and is open at the sides to permit the insertion laterally of the main springs 12—12, each of the latter preferably consisting of an outer heavy coil and lighter nested inner coil. The main springs 12 engage at their forward ends, a spring follower 13 which, as usual, is provided with a forwardly extended annular flange 14 which slides within the friction cylinder 10 and by which the follower is guided. Said flange also serves the purpose of transmitting the pressure from the friction shoes 15 to the springs 12 after the preliminary spring 16 has been compressed. Coöperable with the shoes 15 is a wedge 17, said wedge, shoes, preliminary spring and follower 13 being held in assembled position by means of bolt 18.

It is extremely difficult to insert the spring 12 under an initial compression, laterally into the spring cage inasmuch as the springs are of high capacity and special tools would be required to do this. Accordingly, with my improvements, the main springs are inserted laterally without being put under compression and this is done with the follower 13 bearing directly against the annular shoulder 19 formed at the rear end of the cylinder 10, that is with the keys B, B, hereinafter described, not in place. After this has been accomplished, and before any of the friction elements proper are inserted, the gear is placed in a bulldozer or other suitable machine by which pressure may be readily applied to the follower 13 by means of a plunger 20, as clearly illustrated in Fig. 4. By this simple manner, the springs 12 can be compressed as much as desired and when in the position shown in Fig. 4, the keys B, B are inserted laterally through openings 21—21 in opposite sides of the flange 14. Each of the keys B comprises an outer thickened section 22 which remains outside of the annular flange 14 and is directly interposed between the follower 13 and the shoulder 19, as clearly illustrated in Fig. 1; an intermediate flat section 23; and an offset, flat section 24, the latter fitting within a correspondingly shaped recess 25 formed in the front or outer face of the follower 13. As clearly appears from Figs. 1 and 4, each key B is shouldered and when properly inserted, the shoulders thereof will coöperate with the corresponding shoulders on the follower 13 and prevent displacement laterally of the keys. The keys having been properly inserted, the plunger 20 is removed, whereupon the follower 13 will return to the position indicated in Fig. 1. As will be apparent, the springs 12 are thereby placed under an initial compression which corresponds to the longitudinal dimension or thickness of the section 22 of each key. The preliminary spring 16 is then applied and it will be apparent that its inner end bears against the inner sections 24 of the keys B, and thus retain the latter in place. Finally, the shoes, wedge and anti-friction rollers are applied, as will be understood.

By the simple expedient which I have provided, not only is the assembling of the parts facilitated, but the annular flange 14 of the spring follower 13 is not materially weakened; ample clearance is provided for the preliminary spring; a proper support is provided for the inner end of said spring inasmuch as the bearing faces of the keys lie flush with the outer face of the portions of the follower 13 against which the spring bears; and the keys, when in position, are locked so as to be prevented from either outward radial or circumferential movement.

I claim:

1. In a friction gear, the combination with a friction shell having an integral spring cage, the latter being open at its sides, of a follower mounted within the spring cage, springs at the rear of said follower, said follower having an annular flange slidable within the friction shell, and detachable keys associated with said follower and having portions thereof interposed between the follower and adjacent portions of the friction shell to thereby space the follower from the shell and put the springs under compression, said keys being inserted laterally from the outside of said annular flange through openings in the latter, the keys and follower having engaging shoulders preventing radial and circumferential movement of the keys relatively to the follower.

2. In a device of the character described, the combination with a spring containing member open at its side and through which a spring is adapted to be inserted, a spring, and a spring follower, said spring container having a shoulder against which the follower would normally abut, of a removable key adapted to be inserted laterally through an opening in a portion of said follower, said key being shouldered and coöperating with corresponding shoulders in the follower, whereby the key is prevented from radial and circumferential movement relatively to the follower when it is assembled.

3. A friction gear for railway cars comprising, a friction shell having an integral spring cage, springs arranged within said cage, a follower at the forward ends of said springs, the follower having an annular forwardly extended flange slidable within the friction shell, said flange being slotted on opposite sides, and keys insertible laterally from the outside of said flange through said recesses, the main portion of the follower being recessed and adapted to have portions of said keys seated in said recesses, thus forming inter-engaging shoulders to prevent the keys from moving radially and circumferentially.

In witness that I claim the foregoing I have hereunto subscribed my name this 13th day of July, 1916.

CALVIN B. PATCH.

Witnesses:
GOLDIE A. BISHOP,
ELIZABETH M. BRITT.